(12) United States Patent
Sunkavalli et al.

(10) Patent No.: US 9,857,953 B2
(45) Date of Patent: Jan. 2, 2018

(54) IMAGE COLOR AND TONE STYLE TRANSFER

(71) Applicant: Adobe Systems Incorporated, San Jose, CA (US)

(72) Inventors: Kalyan K. Sunkavalli, San Jose, CA (US); Zhe Lin, Fremont, CA (US); Xiaohui Shen, San Jose, CA (US); Joon-Young Lee, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 143 days.

(21) Appl. No.: 14/944,019

(22) Filed: Nov. 17, 2015

(65) Prior Publication Data
US 2017/0139572 A1 May 18, 2017

(51) Int. Cl.
*G06F 3/0484* (2013.01)
*G06F 3/0488* (2013.01)
*G06T 11/00* (2006.01)

(52) U.S. Cl.
CPC ........ *G06F 3/04845* (2013.01); *G06F 3/0488* (2013.01); *G06F 3/04842* (2013.01); *G06T 11/001* (2013.01)

(58) Field of Classification Search
CPC ....... G06T 5/40; G06T 11/001; G06K 9/4652; G06K 9/6212; H04N 1/54; H04N 1/407; H04N 1/4072; H04N 1/4074
See application file for complete search history.

(56) References Cited

U.S. PATENT DOCUMENTS

| 2010/0226572 A1* | 9/2010 | Adachi | G06T 11/001 382/167 |
| 2012/0139933 A1* | 6/2012 | Mihara | G06T 11/001 345/589 |
| 2015/0110399 A1* | 4/2015 | Valdes Lopez | H04N 1/4074 382/167 |

OTHER PUBLICATIONS

"Automatic Content-Aware Color and Tone Stylization" Lee et al. ArXiv:1511.03748v1 [cs.CV] Nov. 12, 2015. Accessed via web on Jun. 6, 2017 @ https://arxiv.org/pdf/1511.03748.pdf.*
An,"User-controllable color transfer", In CGF, vol. 29, 2010, 9 pages.
Aubry,"Fast Local Laplacian Filters: Theory and Applications", ACM TOG, 33(5), Sep. 2014, 15 pages.
(Continued)

*Primary Examiner* — Antonio A Caschera
(74) *Attorney, Agent, or Firm* — Wolfe-SBMC (57) ABSTRACT

In embodiments of image color and tone style transfer, a computing device implements an image style transfer algorithm to generate a modified image from an input image based on a color style and a tone style of a style image. A user can select the input image that includes color features, as well as select the style image that includes an example of the color style and the tone style to transfer to the input image. A chrominance transfer function can then be applied to transfer the color style to the input image, utilizing a covariance of an input image color of the input image to control modification of the input image color. A luminance transfer function can also be applied to transfer the tone style to the input image, utilizing a tone mapping curve based on a non-linear optimization to estimate luminance parameters of the tone mapping curve.

20 Claims, 5 Drawing Sheets
(2 of 5 Drawing Sheet(s) Filed in Color)

(56) References Cited

OTHER PUBLICATIONS

Bae, "Two-Scale Tone Management for Photographic Look", ACM Transactions on Graphics, 25(3), Proceedings of the ACM SIGGRAPH Conference, 2006, 9 pages.
Bonneel, "Example-Based Video Color Grading", ACM TOG (Proc. SIGGRAPH), 32(4):39:1-39:12,, Jul. 2013, 11 pages.
Faridul, "A Survey of Color Mapping and its Applications", In Eurographics, 2014, 25 pages.
HaCohen, "Non-Rigid Dense Correspondence with Applications for Image Enhancement", SIGGRAPH, 2011, 9 pages.
Hwang, "Color Transfer Using Probabilistic Moving Least Squares", CVPR, 2014, 2014, 8 pages.
Johnson, "CG2Real: Improving the Realism of Computer Generated Images Using a Large Collection of Photographs", IEEE Transactions on Visualization and Computer Graphics, vol. 17, No. 6, Sep. 2011, 13 pages.
Kang, "Personalization of Image Enhancement", Proceedings of the Conference on Computer Vision and Pattern Recognition, 2010, 8 pages.
Laffont, "Transient Attributes for High-Level Understanding and Editing of Outdoor Scenes", ACM TOG (Proc. SIGGRAPH), 33(4), Jul. 2014, 11 pages.
Pitie, "N-Dimensional Probability Density Function Transfer and its Application to Colour Transfer", In ICCV, vol. 2, 2005, 6 pages.
Pitie, "The Linear Monge-Kantorovitch Linear Colour Mapping for Example-Based Colour Transfer", CVMP, 2007, 2007, 9 pages.
Pouli, "Progressive color transfer for images of arbitrary dynamic range", Computers & Graphics 35 (2011), 2011, pp. 67-80.
Reinhard, "Color Transfer between Images", IEEE Computer Graphics and Applications, Sep. 2001, pp. 34-41.
Shih, "Data-driven Hallucination of Different Times of Day from a Single Outdoor Photo", ACM TOG (Proc. SIGGRAPH Asia), Nov. 2013, 11 pages.
Shih, "Style Transfer for Headshot Portraits", ACM TOG (Proc. SIGGRAPH), Jul. 2014, 14 pages.
Xue, "Understanding and Improving the Realism of Image Composites", ACM TOG (Proc. SIGGRAPH), 31(4), Jul. 2012, 10 pages.

* cited by examiner

IMAGE COLOR AND TONE STYLE TRANSFER

BACKGROUND

Many device users have electronic and computing devices, such as desktop computers, laptop computers, mobile phones, tablet computers, multimedia devices, and other similar devices. These types of computing devices are utilized for many different computer applications, to include graphic design, publication development, digital photo image enhancement, and the like. Image color is a fundamental aspect of many art, photography, graphic design, and other visualization projects. Color transfer techniques, also referred to as color correction, color mapping, and color balancing, can be used attempting to change the colors of a given input image to match those of a reference image. When the input and reference images are selected, color correspondences can be determined between the images, defining a mapping between the colors in the input image and the selected reference image, and the mapping can then be used to modify the colors in input image.

Graphic designers and artists often edit the color, contrast, and tonal distributions of photographs (e.g., digital images) to stylize them and achieve a desired visual look, such as when using editing applications like Adobe Photoshop® and Lightroom®. However, the process to edit the color, contrast, and tonal distributions of a photo image can require a great deal of creative input time and user expertise to create an edited image. Some techniques for image color and tone transfer have been implemented in the form of computer applications, but the results can produce un-realistic artifacts in a photo image and result in a poor user experience when using an application as an assistive editing tool. In particular, most of the image color and tone transfer techniques that have been developed completely transfer the color and tone statistics of an example style image to the edited image without taking into account features of the edited image. A complete color and tone transfer is often not desirable and leads to artifacts in the resulting modified image, creating an image with a poor visual result because the modified image color and tone values get stretched or shifted too aggressively based on the example style image.

SUMMARY

This Summary introduces features and concepts of image color and tone style transfer, which is further described below in the Detailed Description and/or shown in the Figures. This Summary should not be considered to describe essential features of the claimed subject matter, nor used to determine or limit the scope of the claimed subject matter.

Image color and tone style transfer is described. In embodiments, a computing device implements an image style transfer algorithm as a computer application that can generate a modified image from an input image based on a color style and a tone style of a style image. A user can select the input image that includes color features, as well as select the style image that includes an example of the color style and the tone style to transfer to the input image. In implementations, the image content in the style image can be different than the image content in the input image, and the different image content provides the color and tone style to transfer to the input image. The image style transfer algorithm can then apply a chrominance transfer function to transfer the color style of the style image to the input image, where the chrominance transfer function implements a covariance of an input image color of the input image to control modification of the input image color. The image style transfer algorithm can also apply a luminance transfer function to transfer the tone style of the style image to the input image, where the luminance transfer function implements a tone mapping curve based on a non-linear optimization to estimate luminance parameters of the tone mapping curve. The luminance transfer function computes the tone mapping curve to approximately match a histogram of the input image luminance to a histogram of the style image luminance. Generating the modified image is based on the color and tone style of the style image without creating visual artifacts of the color features in the modified image by taking into account the input image color and the input image tone.

In other aspects of image color and tone style transfer, the chrominance transfer function is controlled with a chrominance scaling maximum to prevent an over-amplification of the color features in the input image to generate the modified image. The image style transfer algorithm is implemented to compress dynamic ranges of the style image and the input image into a colorspace that decorrelates a luminance component of the tone style from a chrominance component of the color style of the style image. The image style transfer algorithm can then expand the luminance component over a full dynamic range, and clip a designated minimum and a maximum percentage of luminance levels over the full dynamic range. The chrominance transfer function is then applied to the chrominance component and the luminance transfer function is applied to the luminance component to generate the modified image. The chrominance transfer function is implemented to compute a chrominance of the input image, compute a chrominance of the style image, and manipulate the computed chrominance of the input image to approximate the computed chrominance of the style image to generate the modified image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of image color and tone style transfer are described with reference to the following Figures. The same numbers may be used throughout to reference like features and components that are shown in the Figures.

DETAILED DESCRIPTION

Embodiments of image color and tone style transfer are described, and the techniques enable a user to select an input image with color features that the user wants to stylize, such as by enhancing the colors and tone of the input image, and then select a style image that includes an example of the color and tone style to transfer to the input image. The input image can be selected from any image that is accessible on a computing device, such as a photo that has been captured with a camera device and stored in a photo collection on the computing device, or an image that is accessible from cloud storage via a network connection with the device. Similarly, the style image can be selected by the user as any other photo or image, such as may be stored on the computing device, accessible from cloud storage, downloaded from the Internet, and the like. The image color and tone style of the style image can then be transferred to the input image to stylize it, and the techniques transfer the image color and tone style without creating artifacts in a resulting output image (e.g., a modified image of the input image).

To generate a modified image, an image style transfer algorithm (e.g., a software application or module executed on the computing device) implements a chrominance transfer function and a luminance transfer function in embodiments of image color and tone style transfer. The chrominance transfer function is applied to transfer the color style of the style image to the input image, and the luminance transfer function is applied to transfer the tone style of the style image to the input image. Together these two transfer function techniques ensure that the color and tone of the input image are matched to the reference style image without creating visual artifacts of the color features in the modified image by controlling color and tone statistics while taking into account the input image color and the input image tone. The described techniques for image color and tone style transfer are robust and ensure that the input image color and luminance values are matched to the reference style image without being excessively stretched or compressed, which results in a modified image that is significantly, visually better than can be generated by the other various conventional techniques.

While features and concepts of image color and tone style transfer can be implemented in any number of different devices, systems, networks, environments, and/or configurations, embodiments of image color and tone style transfer are described in the context of the following example devices, systems, and methods.

Figure 1:
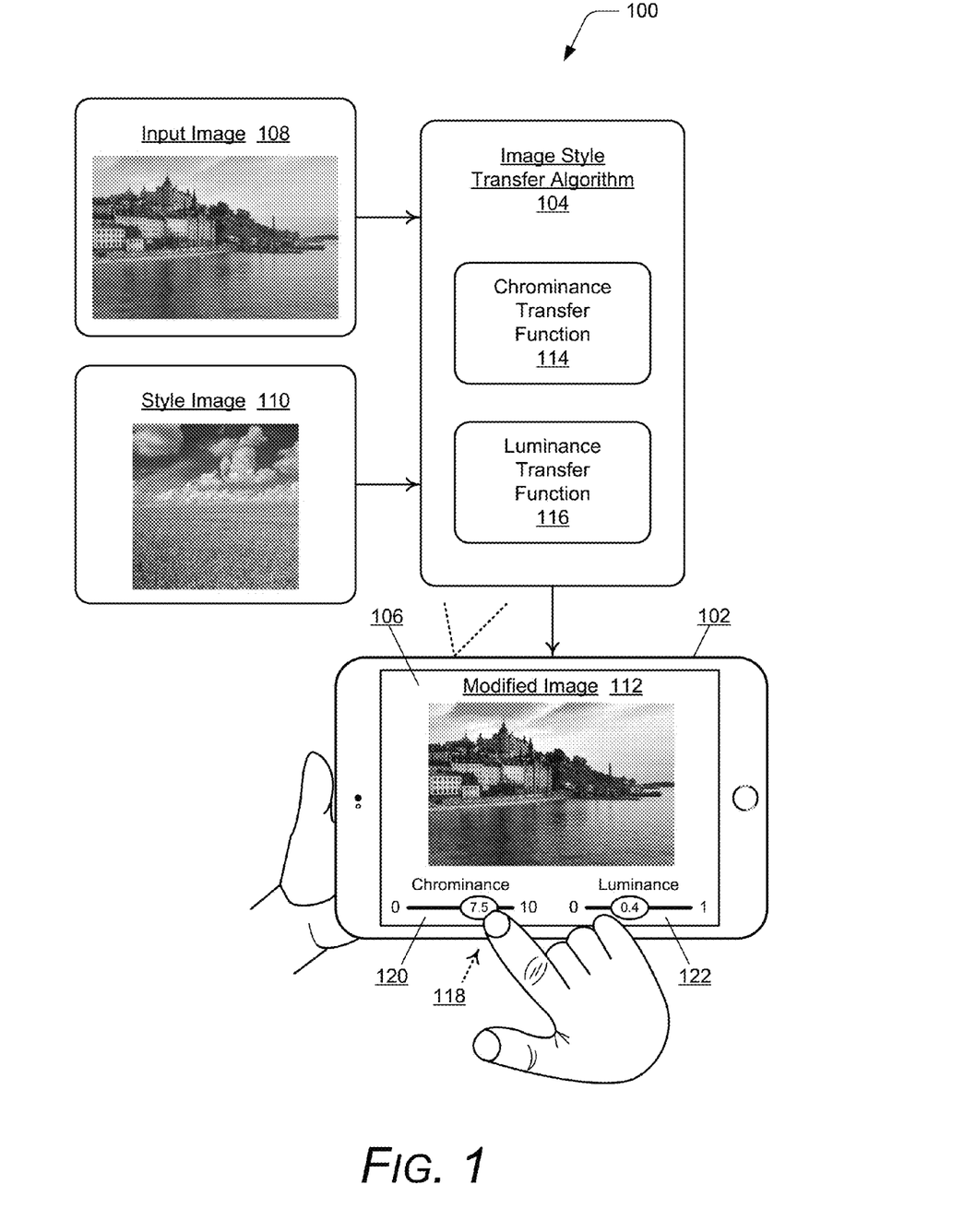
FIG. 1 illustrates an example of image color and tone style transfer implemented with a mobile computing device in accordance with embodiments as described herein.

FIG. 1 illustrates an example 100 of image color and tone style transfer, implemented with a computing device shown as a portable tablet device 102 that executes an image style transfer algorithm 104 as a software application or module of a software application on a processor or processing system of the computing device. As detailed in the system description shown in FIG. 3, the tablet device 102 can display an image style user interface 106 of a computer application implemented by the computing device. For example, many different types of computer applications implement features or functions that provide for graphic design, publication development, artistic creations, digital photo image enhancement, and the like.

In this example, a user of the tablet device 102 can select an input image 108 that has color features the user wants to visually enhance. The user can also select any style image 110 (also referred to as an exemplar image, or reference image) that has a particular color and tone style to transfer or apply to the selected input image. Generally, transferring the color and tone style of the style image to the input image is described herein as applying chrominance and luminance components of the style image 110 (e.g., the exemplar image) to the input image 108 to generate or create a modified image 112 that has enhanced color and tonal features. The input image can be selected from any image that is accessible via the computing device, such as a photo that has been captured with a camera device and stored in a photo collection on the tablet device 102, or an image that is accessible from cloud storage via a network connection with the tablet device. Similarly, the style image 110 can be selected as any other photo or image, such as may be stored on the tablet device, accessible from cloud storage, downloaded from the Internet, and the like.

In some instances, the image content of an input image and a selected style image can be the same, such as two photos of the same scene or persons, and the color and tone style of one of the images is transferred to the other to compensate for the color differences between the two images. It should be noted, however, that the image content of the style image 110 can be different content than in the input image 108, where the different image content provides an example of the color and tone style to transfer to the input image. In this example, the image content of the input image 108 depicts buildings and landscape next to a body of water, whereas the image content of the style image 110 depicts a crop field under a partially cloudy, blue sky. Here, the blue and yellow colors of the sky, buildings, and water in the input image 108 have a muted, washed-out, flat appearance. The user may select the style image 110 that has richer blue and yellow colors of the sky and crop field to enhance the image content of the input image. As shown in the example, the modified image 112 is displayed on the tablet device 102 as a representation of the input image with significantly improved color and tone enhancements derived from the color and tone style of the style image, particularly the blue and yellow colors in the image.

Figure 3:
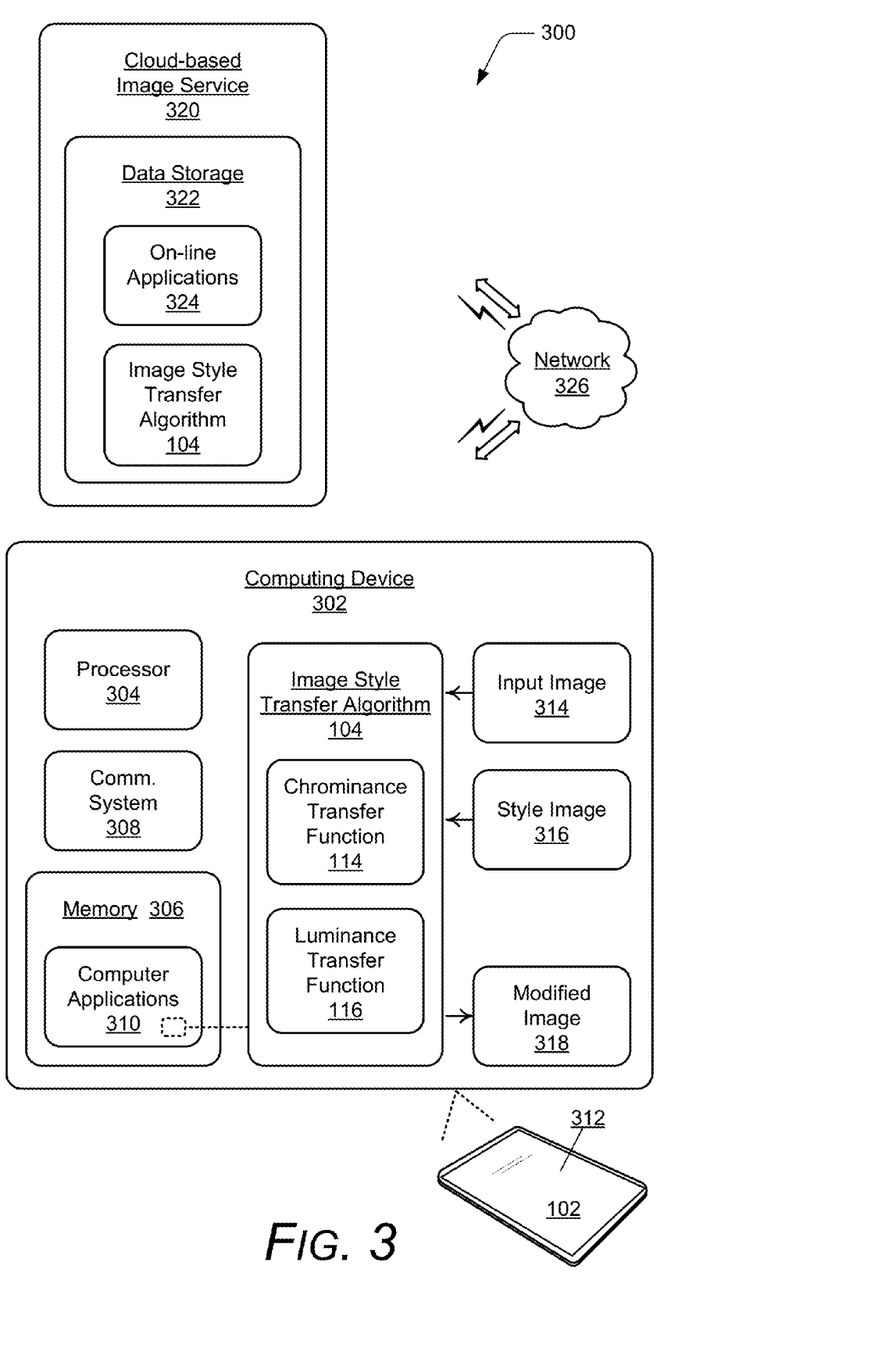
FIG. 3 illustrates an example system in which embodiments of image color and tone style transfer can be implemented.

In embodiments, and as further detailed in the system description shown in FIG. 3, the tablet device 102 implements the image style transfer algorithm 104 (e.g., as a module, a component, a software application, etc.). The image style transfer algorithm 104 can receive a selection of the input image 108 with the color features as a selected input, such as when selected by a user. Similarly, the image style transfer algorithm 104 can receive a selection of the style image 110 that includes an example of the color and tone style to transfer to the input image. The image style transfer algorithm 104 can then generate the modified image 112 from the input image based on the color and tone style of the style image. The image style transfer algorithm 104 is designed to generate the modified image 112 based on the color and tone style of the style image 110 without creating visual artifacts of the color features in the modified image by controlling color and tone statistics while taking into account the input image color and the input image tone.

To generate the modified image 112, the image style transfer algorithm 104 implements a chrominance transfer function 114 and a luminance transfer function 116 in embodiments of image color and tone style transfer. The image style transfer algorithm 104 can apply the chrominance transfer function to transfer the color style of the style image 110 to the input image 108. The image style transfer algorithm 104 can also apply the luminance transfer function 116 to transfer the tone style of the style image to the input image.

The chrominance transfer function implements a covariance of an input image color of the input image 108 to control modification of the input image color. Typically, transferring the color style of a style image to an input image that has low color contrast (e.g., washed-out, low-quality images) can stretch the colors very aggressively, leading to poor image results with artifacts. In embodiments, the covariance of the input image color is used to control how much of the colors can be stretched and/or compressed when generating the modified image 112.

The luminance transfer function 116 implements a tone mapping curve based on a non-linear optimization to estimate luminance parameters of the tone mapping curve. Further, the luminance transfer function 116 computes the tone mapping curve to approximately match a histogram of the input image luminance to a histogram of the style image luminance. Similar to transferring the color style, matching the tone statistics of a low-contrast image to a high-contrast image can distort the luminance leading to poor image results. In embodiments, the tone mapping curve generated by the luminance transfer function 116 is smooth, irrespective of its parameters, and the non-linear optimization estimates the right set of parameters for the tone mapping curve to transfer the tone style of the style image 110 to the input image 108 while also providing for control of the compression and/or expansion of the input luminance.

In other aspects of image color and tone style transfer, the chrominance transfer function 114 is controlled with a chrominance scaling maximum to prevent an over-amplification of the color features in the input image 108 to generate the modified image 112. The image style transfer algorithm 104 is implemented to compress dynamic ranges of the style image 110 and the input image 108 into a colorspace (e.g., the CIELab colorspace) that decorrelates a luminance component of the tone style from a chrominance component of the color style of the style image. The image style transfer algorithm 104 can then expand the luminance component over a full dynamic range, and clip a designated minimum and a maximum percentage of luminance levels over the full dynamic range. The chrominance transfer function 114 is then applied to the chrominance component and the luminance transfer function 116 is applied to the luminance component to generate the modified image 112. The chrominance transfer function 114 is also implemented to compute a chrominance of the input image 108, compute a chrominance of the style image 110, and manipulate the computed chrominance of the input image 108 to approximate the computed chrominance of the style image 110 to generate the modified image 112.

In the illustrated example, the image style user interface 106 displays the modified image 112 along with user-selectable controls (e.g., shown as slider controls) that may be offered as advanced user options to independently adjust the output chrominance and the output luminance of the modified image 112 that is generated by the image style transfer algorithm 104. A user of the tablet device 102 can touch-select at 118 a chrominance user-selectable control 120 to initiate an adjustment of the output chrominance level of the chrominance transfer function 114. In implementations, the output chrominance level can be adjusted on a zero to ten (0 to 10) scale as further detailed in the system description of FIG. 3. In response to an input to the chrominance user-selectable control 120, a regularization term of the chrominance transfer function 114 is manipulated to effectuate the adjustment of the output chrominance level applied to the input image 108 to generate the modified image 112.

Similarly, the user of the tablet device 102 can touch-select a luminance user-selectable control 122 to initiate an adjustment of an output luminance level of the luminance transfer function 116. In implementations, the output luminance level can be adjusted on a zero to one (0 to 1 scale) as further detailed in the system description of FIG. 3. In response to an input to the luminance user-selectable control 122, terms of the luminance transfer function 116 can be manipulated to effectuate the adjustment of the output luminance level applied to the input image 108 to generate the modified image 112.

Figure 2:
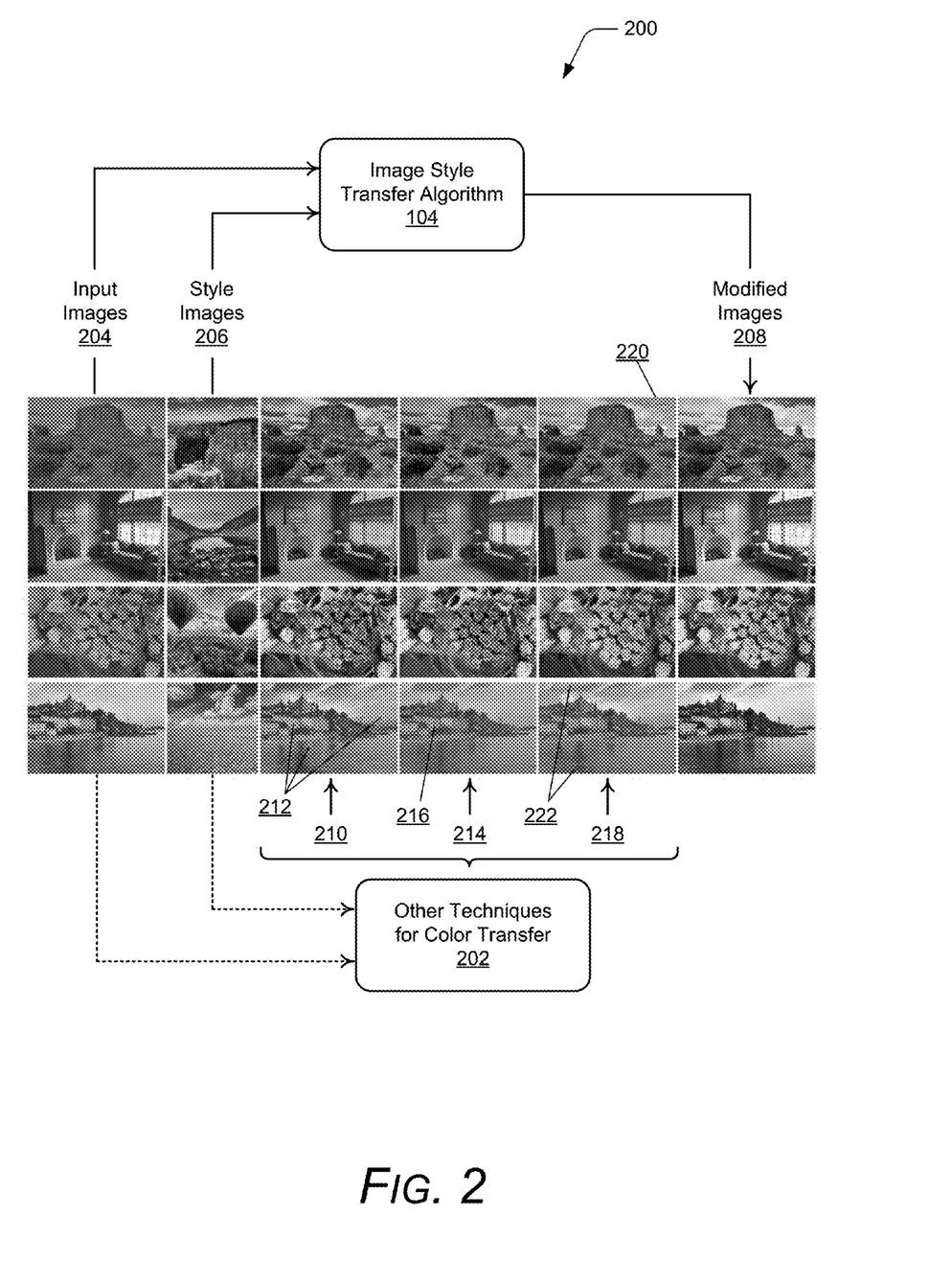
FIG. 2 further illustrates examples of image color and tone style transfer implemented in accordance with embodiments as described herein.

FIG. 2 further illustrates examples 200 of image color and tone style transfer as implemented by the chrominance transfer function 114 and the luminance transfer function 116 of the image style transfer algorithm 104 shown and described with reference to FIG. 1. For discussion purposes, the examples 200 also illustrate a comparison of the quality of some other conventional color transfer techniques 202. In this example, the image style transfer algorithm 104 can receive an input image 204 that has color features, as well as a selection of a style image 206 that includes an example of the color and tone style to transfer to the input image. The image style transfer algorithm 104 can then generate a modified image 208 from the input image 204 based on the color and tone style of the style image 206. The image style transfer algorithm 104 is designed to generate the modified image 208 based on the color and tone style of the style image 206 without creating visual artifacts of the color features in the modified image. Four different examples of a respective input image 204, style image 206, and resulting modified image 208 are shown across four rows in the illustrated examples 200.

The results of the other conventional color transfer techniques 202 are also shown for comparison in the four rows of the illustrated examples 200. Image results 210 are shown for an N-dimensional histogram matching technique by Pitié et al. (F. Pitié, A. C. Kokaram, and R. Dahyot. *N-Dimensional Probability Density Function Transfer and its Application to Color Transfer*, in ICCV, volume 2, pages 1434-1439, 2005). This technique often suffers from artifacts when the input image 204 and the exemplar color distributions of the style image 206 are very different, such as shown with reference to the images of the room in the second row example (e.g., the style image 206 for the room input image is an unrelated landscape), and with reference to the images of the buildings and water in the fourth row example. The colors in the resulting images of the room in the second row example have an overly-reddish hue based on the red sunset in the landscape input image, while the yellows 212 in the resulting image 210 of the buildings and water in the fourth row are unnatural with very little contrast, and without smooth transitions between the blue and yellow colors.

Image results 214 are also shown for the linear Monge-Kantarovich solution of Pitié and Kokaram (F. Pitié and A. Kokaram. *The Linear Monge-Kantorovitch Linear Colour Mapping for Example-Based Colour Transfer*. In CVMP, 2007). This technique (also referred to as the MK method) is more robust, but in some cases, suffers from color saturation artifacts, as shown with reference to the images of the buildings and water in the fourth row example. Again, the yellows 216 in the resulting image 214 of the building and water are unnatural. Further the affine color mapping of the MK method does not capture non-linear tone curves.

Image results 218 are also shown for a three-band technique of Bonneel et al. (N. Bonneel, K. Sunkavalli, S. Paris, and H. Pfister. *Example-Based Video Color Grading*, ACM TOG (Proc. SIGGRAPH), 32(4):39:1-39:12, July 2013). This technique (also referred to as the SMH method) generates more expressive results by applying the MK method to three luminance bands and using a non-linear tone curve, but adds more artifacts to resulting images around band transition regions, such as shown with reference to the unnatural blue sky 220 in the first row example, and with reference to the unnatural blue sky and water 222 in the fourth row example of the buildings and water.

In embodiments, only the technique described herein for image color and tone style transfer consistently produces visually compelling results without any artifacts in the modified images 208. In particular, when the image content of the style image 206 is a good match to the image content of the input image 204 (e.g., as shown with reference to the first row of images), the described technique for image color and tone style transfer generates the resulting modified image 208 that is comparable or better than the resulting images generated by the other conventional color transfer techniques 202. However, when the style image 206 has very different image content than the input image 204 (e.g., as shown with reference to the room in the second row of images), the other conventional color transfer techniques 202 produce very poor resulting images. In contrast, the described technique for image color and tone style transfer generates the modified images that are visually pleasing and without artifacts, even though the image content of the style image 206 does not match the image content of the input image 204.

FIG. 3 illustrates an example system 300 in which embodiments of image color and tone style transfer can be implemented. The example system 300 includes a computing device 302, such as the tablet device 102 shown in FIG. 1, or any other type of a mobile phone, media playback, computing, communication, gaming, entertainment, portable electronic media device, or computer device. The computing device 302 can be implemented with various components, such as a processor 304 (or processing system) and memory 306, and with any number and combination of differing components as further described with reference to the example device shown in FIG. 5. Although not shown, the computing device 302 can include a power source, such as a battery, to power the various device components. Further, the computing device 302 can include different wireless radio systems, such as for Wi-Fi, Bluetooth™, Mobile Broadband, LTE, or any other wireless communication system or format. Generally, the computing device 302 implements a communication system 308 that includes a radio device, antenna, and chipset that is implemented for wireless communication with other devices, networks, and services.

The computing device 302 includes one or more computer applications 310, any of which may generate the image style user interface 106 for display on a display device 312 of the computing device, as referred to above. The computer applications 310 can include many different types of computer applications that implement features or functions that provide for graphic design, publication development, artistic creations, digital photo image enhancement, and the like. Any of the different types of computer applications 310 can include the image style transfer algorithm 104 that implements embodiments of image color and tone style transfer, as illustrated and described above with reference to FIGS. 1 and 2.

The image style transfer algorithm 104 includes the chrominance transfer function 114 and the luminance transfer function 116, and can be implemented as a software application or module, such as computer-executable software instructions that are executable with the processor 304 (or with a processing system) to implement embodiments described herein. The image style transfer algorithm 104 can be stored on computer-readable storage memory (e.g., the device memory 306), such as any suitable memory device or electronic data storage implemented in the computing device. Although shown as a separate module or component, the image style transfer algorithm 104 may be integrated as a module or component with any of the computer applications 310 in implementations of image color and tone style transfer.

As described above, the image style transfer algorithm 104 is implemented to receive an input image 314 that has color features, as well as a selection of a style image 316 that includes an example of the color and tone style to transfer to the input image. The image style transfer algorithm 104 can then generate a modified image 318 from the input image 314 based on the color and tone style of the style image 316. As previously noted, conventional techniques used to transfer color between images, such as by matching the statistics of the images color distributions, produces artifacts in the resulting image, particularly when the style image and the input image statistics are very disparate. This is because the conventional techniques transfer the input image statistics even when doing so might degrade the quality of the resulting image. The conventional style transfer techniques also attempt to match the contrast and tone between images (e.g., an input image and a style image).

In contrast, embodiments of image color and tone style transfer, as implemented by the image style transfer algorithm 104, utilize regularized color and tone mapping functions (e.g., the chrominance transfer function 114 and the luminance transfer function 116) that are very robust to estimate. The regularization in these functions ensures that the color and tone style of a style image 316 is transferred to the input image 314 when possible, but weakens the transfer if strong distortions may result that might lead to artifacts in the modified image 318.

In implementations, the chrominance transfer function 114 is partially based on the technique described by Pitié et al. (F. Pitié and A. Kokaram. *The Linear Monge-Kantorovitch Linear Colour Mapping for Example-Based Colour Transfer.* In CVMP, 2007). However, in embodiments of image color and tone style transfer, a regularization term is added to account for large differences in the color distributions being matched. This ensures that the color transfer is accurate if the transfer function is stable, but is weakened if it is unstable and might produce color artifacts in the modified image 318. The luminance transfer function 116 implements a parametric luminance reshaping curve that is designed to be smooth and avoids artifacts in the resulting modified image 318. Similar to the color transfer technique, the strength of the tone transfer can be controlled to reduce strong changes that may introduce and appear as artifacts in the modified image.

In embodiments, the input image 314 is stylized by the image style transfer algorithm 104 applying global transforms to match its color and tonal statistics to those of a style example (e.g., the style image 316). Although this discussion generally focuses on stylizations as global transformations of color and tone of an input image 314, the techniques implemented by the image style transfer algorithm 104 encompass a wide range of stylizations that artists and graphic designers may use, including color mixing, hue and saturation shifts, and non-linear tone adjustments. Further, the techniques described herein take into account the importance of balancing between expressiveness and robustness while choosing the style transfer model. While a very flexible transfer model can capture a wide range of photographic looks, it is also important that the transfer model can be robustly estimated and does not cause artifacts in the resulting modified image 318. This is of particular importance here, where the input and style images that are being mapped may differ significantly in their image content.

To effectively stylize images with global transforms, the image style transfer algorithm 104 is implemented to first compress the dynamic ranges of the two images (e.g., the input image 314 and the style image 316) using a γ (=2:2) mapping and convert the images into the CIELab colorspace because it decorrelates the different luminance and chrominance channels. The CIELab colorspace provides a perceptually uniform colorspace for color translation and conversion. The image style transfer algorithm 104 is implemented to then stretch the luminance channel (i.e., L channel) to cover the full dynamic range after clipping both the minimum and the maximum one-half (0.5) percent pixels of luminance levels, and apply the different transfer functions to the luminance and chrominance components.

The image style transfer algorithm 104 implements the chrominance transfer function to map the statistics of the chrominance channels of the two images (e.g., the input image 314 and the style image 316). In implementations, the chrominance distribution of an image is modeled using a multivariate Gaussian, and a transfer function is determined that creates the output image O by mapping the Gaussian statistics $\mathcal{N}_{S,S}(\mu_S, \Sigma_S)$ of the style image S to the Gaussian statistics $\mathcal{N}_{S,I}(\mu_I, \Sigma_I)$ of the input image I in equation (1) as:

$$c_O(x) = T(c_I(x) - \mu_I) + \mu_S \text{ s.t. } T\Sigma_I T^T = \Sigma_S$$

where T represents a linear transformation that maps chrominance between the two images and c(x) is the chrominance at pixel x. Following Pitié et al. as referenced above, the chrominance transfer function solves for the color transform using the following closed form solution in equation (2):

$$T = \Sigma_I^{-1/2} (\Sigma_I^{1/2} \Sigma_S \Sigma_I^{1/2})^{1/2} \Sigma_I^{-1/2}$$

This solution is unstable for low input covariance values, leading to color artifacts when the input has low color variation. Note that $\Sigma_I$ is inverted in equation (2) (i.e., $E_I^{-1/2}$), so that when $\Sigma_I$ has very low values and is inverted, the resulting output chrominance values of T are very high, which can cause artifacts in the resulting modified image 318. To avoid this, a maximum chrominance scaling can be specified so that the color values are not over-amplified, and the chrominance transfer function 114 is regularized by clipping diagonal elements of $\Sigma_I$ in equation (3) as:

$$\Sigma_I' = \max(\Sigma_I, \lambda_r \mathbb{I})$$

where $\mathbb{I}$ represents an identity matrix, and substituting it into equation (2), where the $\Sigma_I$ value is the covariance of the chrominance of the input image 314. This formulation has the advantage that it only regularizes color channels with low variation without affecting the others, and in practice, a regularization of $\lambda_r = 7.5$ can be implemented. This value can be adjusted to a higher value for more conservative stylization (e.g., with fewer artifacts in a resulting modified image 318) or to a lower setting to allow more dramatic stylizations (e.g., with potentially more artifacts in the modified image 318).

The image style transfer algorithm 104 implements the luminance transfer function 116 to match contrast and tone using histogram matching between the luminance channels of the input image 314 and the style image 316 (e.g., also referred to as the exemplar image). As mentioned above with reference to the conventional techniques for color and tone transfer, direct histogram matching typically results in arbitrary transfer functions and may produce artifacts in the modified image 318 due to non-smooth mapping, or excessive stretching and/or compressing of the luminance values. Alternatively, the luminance transfer function 116 of the image style transfer algorithm is designed for a new parametric model of luminance mapping that allows for strong expressiveness and regularization simultaneously. The luminance transfer function 116 is defined in equation (4) as:

$$l_O(x) = g(l_I(x)) = \frac{\arctan\left(\frac{m}{\delta}\right) + \arctan\left(\frac{l_I(x) - m}{\delta}\right)}{\arctan\left(\frac{m}{\delta}\right) + \arctan\left(\frac{1-m}{\delta}\right)}$$

where $l_I(x)$ and $l_O(x)$ are the input and output luminance respectively, and m and δ are the two parameters of the mapping function. The value m is determined as the inflection point of the mapping function, and the value δ indicates the degree of luminance stretching around the inflection point. This parametric function can represent a diverse set of tone mapping curves and the image style transfer algorithm 104 can control the degree of stretching and/or compressing of tone. Since the derivative of equation (4) is always positive and continuous, it will be a smooth and monotonically increasing curve. This provides that the luminance transfer function 116 (e.g., the mapping function) generates a proper luminance mapping curve for any set of parameters.

The image style transfer algorithm can extract a luminance feature L that represents the luminance histogram with uniformly sampled percentiles of the luminance cumulative distribution function (e.g., using thirty-two samples). The tone-mapping parameters can be estimated by minimizing the cost function in equation (5):

$$(\hat{m}, \hat{\delta}) = \underset{m, \delta}{\operatorname{argmin}} \|g(L_I) - \hat{L}\|^2, \hat{L} = L_I + (L_S - L_I)\frac{\tau}{t}, t = \min(\tau, |L_S - L_I|\infty)$$

where $L_I$ and $L_S$ represent the input and style luminance features, respectively. The $\hat{L}$ is an interpolation of the input and exemplar luminance features and represents how closely the exemplar luminance distribution is matched. How well the input tone matches the style tone can be controlled by changing τ, such as by setting it to 1.0 reproduces the style tone characteristics and lowering it relaxes this condition. In implementations, the τ is set to 0.4 and the cost is minimized using parameter sweeping in a branch-and-bound scheme.

The example system 300 can also include a cloud-based image service 320, such as Adobe Creative Cloud™ that is accessible by client devices, to include the computing device 302 and the tablet device 102. The cloud-based image service 320 includes data storage 322 that may be implemented as any suitable memory, memory device, or electronic data storage for network-based data storage. The data storage can maintain an instance of the image style transfer algorithm 104, as well as on-line applications 324 (e.g., as network-based applications), that are accessible by a computer application 310 from the computing device 302.

The cloud-based image service 320 can also be implemented with server devices that are representative of one or multiple hardware server devices of the image service. Further, the cloud-based image service 320 can be implemented with various components, such as a processing system and memory, as well as with any number and combination of differing components as further described with reference to the example device shown in FIG. 5 to implement the services, applications, servers, and other features of image color and tone style transfer.

The example system 300 also includes a network 326, and any of the devices, servers, and/or services described herein can communicate via the network, such as for data communication between the computing device 302 and the cloud-based image service 320. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example method 400 is described with reference to FIG. 4 in accordance with embodiments of image color and tone style transfer. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
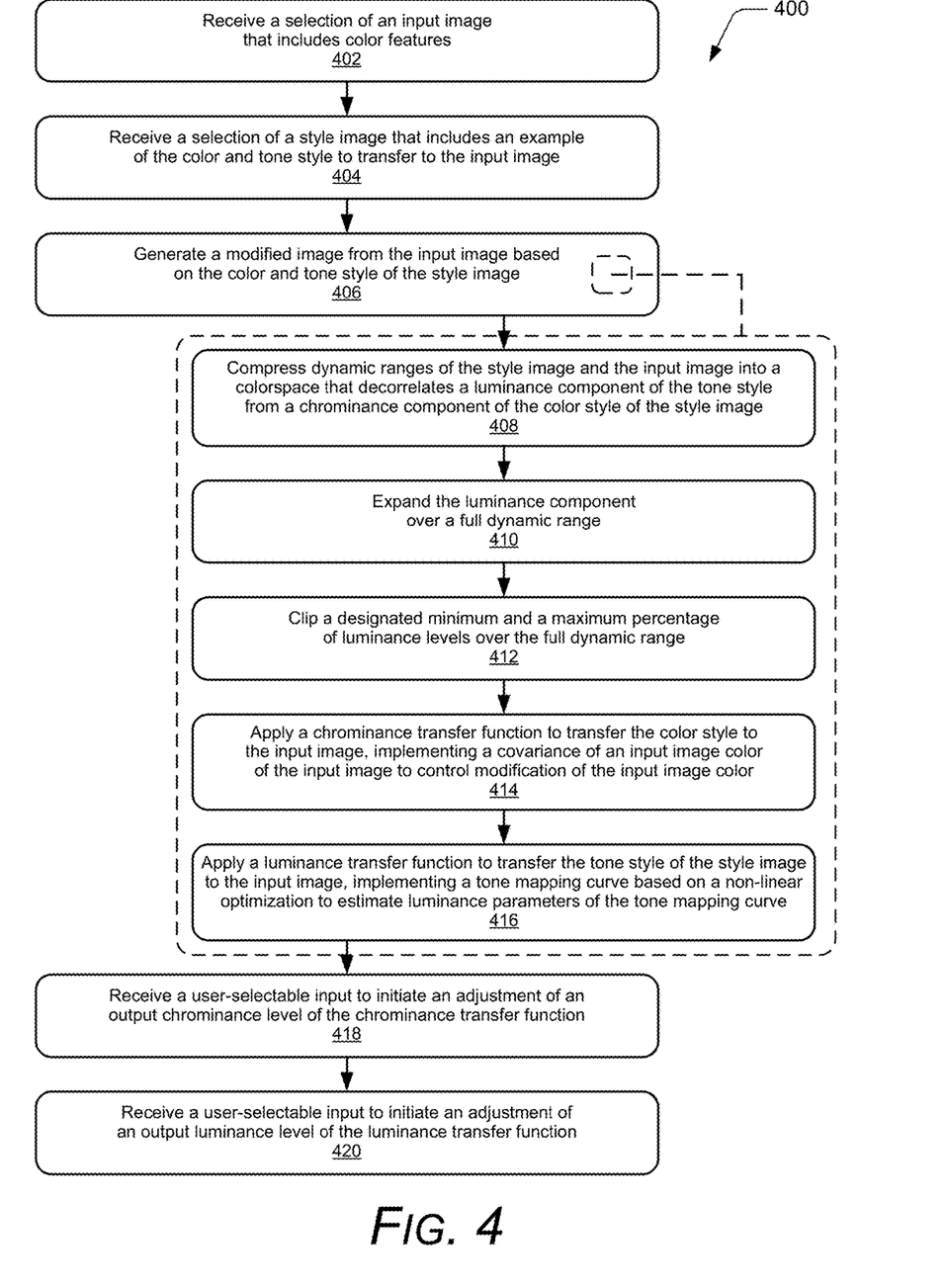
FIG. 4 illustrates example methods of image color and tone style transfer in accordance with embodiments of the techniques described herein.

FIG. 4 illustrates example method(s) 400 of image color and tone style transfer of a style image to an input image, and is generally described with reference to the image style transfer algorithm implemented by the computing device as shown in the example system of FIG. 3. The order in which the method is described is not intended to be construed as a limitation, and any number or combination of the method operations can be combined in any order to implement a method, or an alternate method.

At 402, a selection of an input image that includes color features is received. For example, the image style transfer algorithm 104 receives a user selection of the input image 108 that includes color features to be stylized with a color and tone style transfer. At 404, a selection of a style image is received, and the style image includes an example of the color and tone style to transfer to the input image. For example, the image style transfer algorithm 104 receives a user selection of the style image 110 that includes the example of the color and tone style to transfer to the input image 108. In implementations, the image content in the style image 110 can be different than the image content in the input image 108, and the different image content provides the color and tone style to transfer to the input image. Alternatively, the image content of both the input image 108 and the style image 110 may be of the same scene or persons, and the color and tone style transfer is implemented to compensate for the color differences between the two images.

At 406, a modified image is generated from the input image based on the color and tone style of the style image. For example, the image style transfer algorithm 104 generates the modified image 112 from the input image 108 based on the color and tone style of the style image 110, and the modified image 112 is generated without creating visual artifacts of the color features in the modified image by taking into account the input image color and an input image tone. In embodiments of image color and tone style transfer, generating the modified image 112 (at 406) encompasses any one or a combination of the described method operations 408-416 below.

At 408, dynamic ranges of the style image and the input image are compressed into a colorspace that decorrelates a luminance component of the tone style from a chrominance component of the color style of the style image. For example, the image style transfer algorithm 104 compresses dynamic ranges of the style image 110 and the input image 108 into a colorspace, such as the CIELab colorspace, that decorrelates a luminance component of the tone style from a chrominance component of the color style of the style image.

At 410, the luminance component is expanded over a full dynamic range and, at 412, a designated minimum and a maximum percentage of luminance levels are clipped over the full dynamic range. For example, the image style transfer algorithm 104 expands the luminance component over a full dynamic range, and clips a minimum and a maximum one-half (0.5) percentage of the luminance levels over the full dynamic range.

At 414, a chrominance transfer function is applied to transfer the color style of the style image to the input image, the chrominance transfer function implementing a covariance of an input image color of the input image to control modification of the input image color. For example, the chrominance transfer function 114 applies the color style of the style image 110 to the input image 108, and the chrominance transfer function 114 implements a covariance of an input image color of the input image 108 to control modification of the input image color. In implementations, the chrominance transfer function 114 is controlled with a chrominance scaling maximum to prevent an over-amplification of the color features in the input image 108 to generate the modified image 112. The chrominance transfer function 114 is implemented to compute a chrominance of the input image 108, compute a chrominance of the style image 110, and manipulate the computed chrominance of the input image 108 to approximate the computed chrominance of the style image 110.

At 416, a luminance transfer function is applied to transfer the tone style of the style image to the input image, the luminance transfer function implementing a tone mapping curve based on a non-linear optimization to estimate luminance parameters of the tone mapping curve. For example, the luminance transfer function 116 applies the tone style of the style image 110 to the input image 108, and the luminance transfer function 116 implements the tone mapping curve based on a non-linear optimization to estimate the luminance parameters of the tone mapping curve. The luminance transfer function 116 computes the tone mapping curve to approximately match a histogram of the input image luminance to a histogram of the style image luminance.

At 418, a user-selectable input is received to initiate an adjustment of an output chrominance level of the chrominance transfer function. For example, the image style user interface 106 includes the chrominance user-selectable control 120, and the image style transfer algorithm 104 receives a user input to initiate an adjustment of an output chrominance level of the chrominance transfer function 114. In response to an input to the chrominance user-selectable control 120, a regularization term of the chrominance transfer function 114 is manipulated to effectuate the adjustment of the output chrominance level applied to the input image 108 to generate the modified image 112.

At 420, a user-selectable input to initiate an adjustment of an output luminance level of the luminance transfer function. For example, the image style user interface 106 includes the luminance user-selectable control 122, and the image style transfer algorithm 104 receives a user input to initiate an adjustment of an output luminance level of the luminance transfer function 116. In response to an input to the luminance user-selectable control 122, terms of the luminance transfer function 116 can be manipulated to effectuate the adjustment of the output luminance level applied to the input image 108 to generate the modified image 112.

Figure 5:
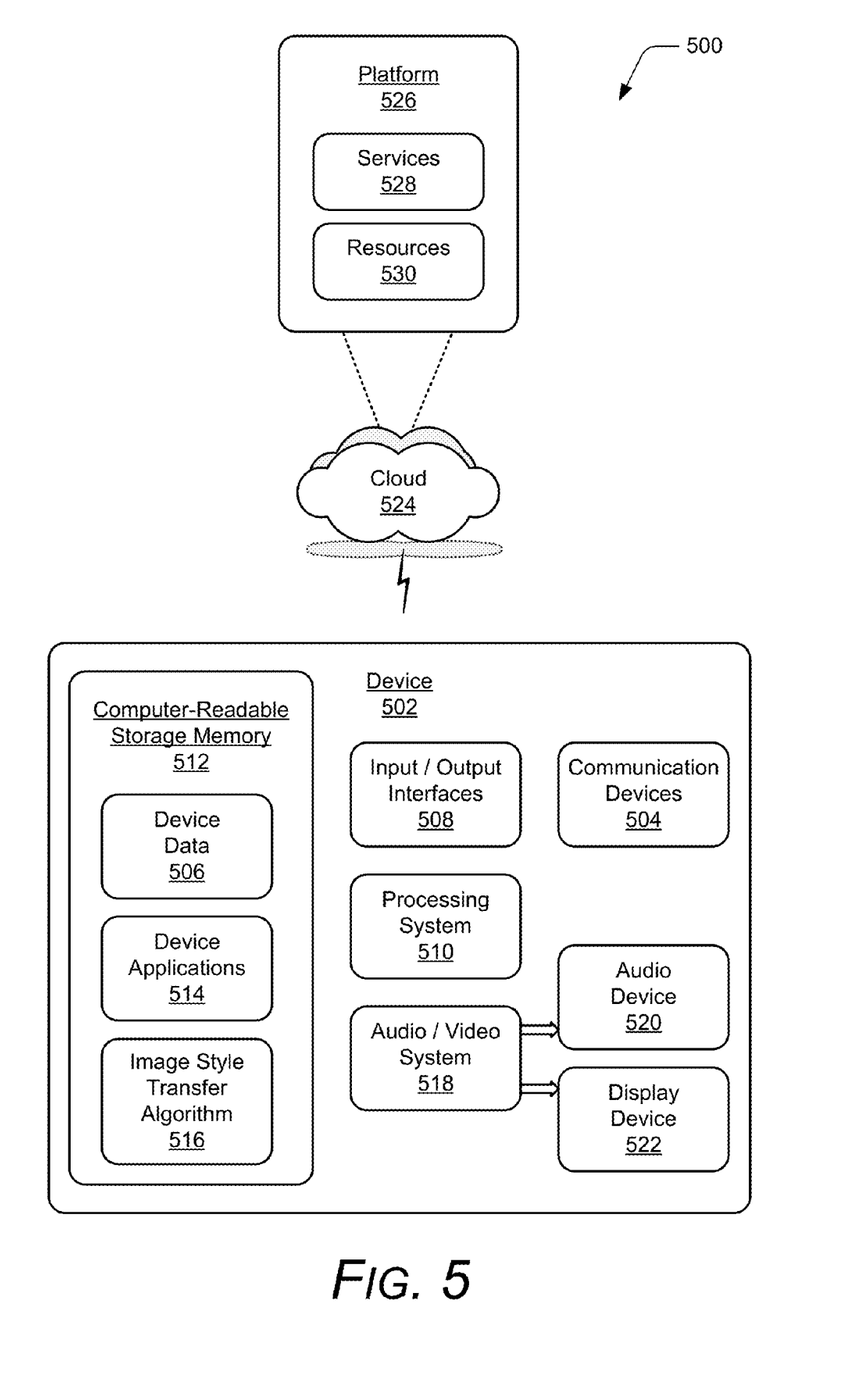
FIG. 5 illustrates an example system with an example device that can implement embodiments of image color and tone style transfer.

FIG. 5 illustrates an example system 500 that includes an example device 502, which can implement embodiments of image color and tone style transfer. The example device 502 can be implemented as any of the computing devices and/or services (e.g., server devices) described with reference to the previous FIGS. 1-4, such as any type of computing device, client device, mobile phone, tablet, communication, entertainment, gaming, media playback, and/or other type of device. For example, the tablet device 102, the computing device 302, and/or server devices of the cloud-based image service 320 may be implemented as the example device 502.

The device 502 includes communication devices 504 that enable wired and/or wireless communication of device data 506, such as input images, selected style images, and resulting modified images, as well as computer applications content that is transferred from one computing device to another, and/or synched between multiple computing devices. The device data can include any type of audio, video, image, and/or graphic data generated by applications executing on the device. The communication devices 504 can also include transceivers for cellular phone communication and/or for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices, such as a digital camera device that may be integrated with device 502. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes computer-readable storage memory 512, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 512 provides storage of the device data 506 and various device applications 514, such as an operating system maintained as a software application with the computer-readable storage memory and executed by the processing system 510. In this example, the device applications also include various computer applications and an image style transfer algorithm 516 that implement embodiments of image color and tone style transfer, such as when the example device 502 is implemented as the computing device 302 shown in FIG. 3. Examples of the image style transfer algorithm 516 include the image style transfer algorithm 104 implemented by the computing device 302 and/or by the cloud-based image service 320, as described with reference to FIG. 3.

The device 502 also includes an audio and/or video system 518 that generates audio data for an audio device 520 and/or generates display data for a display device 522. The audio device and/or the display device include any devices that process, display, and/or otherwise render audio, video, display, and/or image data, such as the image content of a digital photo. In implementations, the audio device and/or the display device are integrated components of the example device 502. Alternatively, the audio device and/or the display device are external, peripheral components to the example device. In embodiments, at least part of the techniques described for image color and tone style transfer may be implemented in a distributed system, such as over a "cloud" 524 in a platform 526. The cloud 524 includes and/or is representative of the platform 526 for services 528 and/or resources 530. For example, the services 528 may include the cloud-based image service described with reference to FIG. 3.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although embodiments of image color and tone style transfer have been described in language specific to features and/or methods, the appended claims are not necessarily limited to the specific features or methods described. Rather, the specific features and methods are disclosed as example implementations of image color and tone style transfer, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method to transfer a color and tone style of a style image to an input image, the method comprising:
   receiving a selection of the input image that includes color features;
   receiving a selection of the style image that includes an example of the color and tone style to transfer to the input image;
   generating a modified image from the input image based on the color and tone style of the style image, the generating performed by an image style transfer algorithm executed by a memory and processor system of a computing device, the generating comprising:
   applying a chrominance transfer function to transfer the color style of the style image to the input image, the chrominance transfer function implementing a covariance of an input image color of the input image to control modification of the input image color; and
   applying a luminance transfer function to transfer the tone style of the style image to the input image, the luminance transfer function implementing a tone mapping curve based on a non-linear optimization to estimate luminance parameters of the tone mapping curve.

2. The method as recited in claim 1, wherein said generating the modified image based on the color and tone style of the style image without creating visual artifacts of the color features in the modified image by taking into account the input image color and an input image tone.

3. The method as recited in claim 1, further comprising, prior to said applying the chrominance transfer function and said applying the luminance transfer function:
   compressing dynamic ranges of the style image and the input image into a colorspace that decorrelates a luminance component of the tone style from a chrominance component of the color style of the style image;
   expanding the luminance component over a full dynamic range;
   clipping a designated minimum and a maximum percentage of luminance levels over the full dynamic range; and
   said applying the chrominance transfer function to the chrominance component and said applying the luminance transfer function to the luminance component to generate the modified image.

4. The method as recited in claim 1, wherein image content in the style image is different than in the input image, the different image content providing the color and tone style to transfer to the input image.

5. The method as recited in claim 1, wherein the chrominance transfer function is controlled with a chrominance scaling maximum to prevent an over-amplification of the color features in the input image to generate the modified image.

6. The method as recited in claim 1, wherein the chrominance transfer function is implemented to:
   compute a chrominance of the input image;
   compute a chrominance of the style image; and
   manipulate the computed chrominance of the input image to approximate the computed chrominance of the style image.

7. The method as recited in claim 1, further comprising:
   receiving a user-selectable input to initiate an adjustment of an output chrominance level of the chrominance transfer function, wherein a regularization term of the chrominance transfer function is manipulated to effectuate the adjustment of the output chrominance level applied to the input image to generate the modified image.

8. The method as recited in claim 1, wherein the luminance transfer function computes the tone mapping curve to approximately match a histogram of the input image luminance to a histogram of the style image luminance.

9. The method as recited in claim 1, further comprising:
   receiving a user-selectable input to initiate an adjustment of an output luminance level of the luminance transfer function, wherein terms of the luminance transfer function are manipulated to effectuate the adjustment of the output luminance level applied to the input image to generate the modified image.

10. A computing device implemented to transfer a color and tone style of a style image to an input image, the computing device comprising:
    a display device configured to display the input image that includes color features;
    a memory and processor system configured to execute an image style transfer algorithm as a computer application implemented to generate a modified image from the input image based on the color and tone style of the style image, the image style transfer algorithm configured to:
    apply a chrominance transfer function to transfer the color style of the style image to the input image, the chrominance transfer function implementing a covariance of an input image color of the input image to control modification of the input image color; and
    apply a luminance transfer function to transfer the tone style of the style image to the input image, the luminance transfer function implementing a tone mapping curve based on a non-linear optimization to estimate luminance parameters of the tone mapping curve.

11. The computing device as recited in claim 10, wherein the image style transfer algorithm is further implemented to said generate the modified image based on the color and tone style of the style image without creating visual artifacts of the color features in the modified image by taking into account the input image color and an input image tone.

12. The computing device as recited in claim 10, wherein the image style transfer algorithm is further implemented to:
    compress dynamic ranges of the style image and the input image into a colorspace that decorrelates a luminance component of the tone style from a chrominance component of the color style of the style image;
    expand the luminance component over a full dynamic range;
    clip a designated minimum and a maximum percentage of luminance levels over the full dynamic range; and
    said apply the chrominance transfer function to the chrominance component and said apply the luminance transfer function to the luminance component to generate the modified image.

13. The computing device as recited in claim 10, wherein the chrominance transfer function is controlled with a chrominance scaling maximum to prevent an over-amplification of the color features in the input image to generate the modified image.

14. The computing device as recited in claim 10, wherein the chrominance transfer function is implemented to:
compute a chrominance of the input image;
compute a chrominance of the style image; and
manipulate the computed chrominance of the input image to approximate the computed chrominance of the style image.

15. The computing device as recited in claim 10, wherein luminance transfer function computes the tone mapping curve to approximately match a histogram of the input image luminance to a histogram of the style image luminance.

16. The computing device as recited in claim 10, further comprising an image style user interface configured to display the modified image, the image style user interface comprising:
a chrominance user-selectable control to initiate an adjustment of an output chrominance level of the chrominance transfer function, wherein a regularization term of the chrominance transfer function is manipulated to effectuate the adjustment of the output chrominance level applied to the input image to generate the modified image; and
a luminance user-selectable control to initiate an adjustment of an output luminance level of the luminance transfer function, wherein terms of the luminance transfer function are manipulated to effectuate the adjustment of the output luminance level applied to the input image to generate the modified image.

17. A method for image color and tone style transfer, the method comprising:
executing an image style transfer algorithm as a computer application by a memory and processor system of a computing device, the image style transfer algorithm performing:
transferring a color style of a style image to an input image to generate a modified image, the color style of the style image applied based on a covariance of an input image color of color features in input image, the covariance of the input image color controlling modification of the input image color; and
transferring a tone style of the style image to the input image to said generate the modified image, the tone style of the style image applied based on a tone mapping curve computed to approximately match a histogram of the input image luminance to a histogram of the style image luminance.

18. The method as recited in claim 17, wherein the modified image is generated based on the color style and the tone style of the style image without creating visual artifacts of the color features in the modified image by taking into account the input image color and an input image tone.

19. The method as recited in claim 17, wherein said transferring the color style of the style image is controlled with a chrominance scaling maximum to prevent an overamplification of the color features in the input image to generate the modified image.

20. The method as recited in claim 17, wherein said transferring the tone style of the style image comprises:
computing a chrominance of the input image;
computing a chrominance of the style image; and
manipulating the computed chrominance of the input image to approximate the computed chrominance of the style image.

* * * * *